United States Patent
de la Broise

(10) Patent No.: US 11,317,237 B2
(45) Date of Patent: *Apr. 26, 2022

(54) SECURE AND PRIVATE CLOUD BASED BROADCAST IDENTIFICATION

(71) Applicant: Tile, Inc., San Mateo, CA (US)

(72) Inventor: Josselin de la Broise, Mountain View, CA (US)

(73) Assignee: Tile, Inc., San Mateo, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/037,022

(22) Filed: Sep. 29, 2020

(65) Prior Publication Data
US 2021/0014634 A1    Jan. 14, 2021

Related U.S. Application Data

(63) Continuation of application No. 16/575,979, filed on Sep. 19, 2019, now Pat. No. 10,827,299, which is a (Continued)

(51) Int. Cl.
*H04W 4/02* (2018.01)
*H04L 67/303* (2022.01)
(Continued)

(52) U.S. Cl.
CPC ............... *H04W 4/02* (2013.01); *H04L 67/18* (2013.01); *H04L 67/303* (2013.01);
(Continued)

(58) Field of Classification Search
CPC ....... H04L 67/303; H04L 67/18; H04L 63/12; H04L 67/16; H04W 64/006; H04W 4/02; H04W 12/06; H04W 12/10; Y02D 30/70
See application file for complete search history.

(56) References Cited

U.S. PATENT DOCUMENTS 6,058,309 A * 5/2000 Huang ................. H04W 48/18
455/433
7,114,175 B2 * 9/2006 Lahteenmaki ...... H04L 63/0823
726/4

(Continued)

FOREIGN PATENT DOCUMENTS

EP        2493231 A2 * 8/2012 .......... H04W 12/069
WO     WO 2014/042507       3/2014

OTHER PUBLICATIONS

PCT International Search Report and Written Opinion, PCT Application No. PCT/US2015/054506, dated Feb. 23, 2016, 17 pages.
(Continued)

*Primary Examiner* — Mehmood B. Khan
(74) *Attorney, Agent, or Firm* — Fenwick & West LLP

(57) ABSTRACT

A tracking device can securely communicate with a secondary device by generating a hash value based on the identity of the tracking device. If the secondary device cannot resolve the hash value, the hash value can be provided to a tracking server, such as a cloud server, for resolving the hash value. Upon resolving the hash value, the tracking server can store a location of the tracking device in association with the identity of the tracking device. To preserve power, the secondary device can activate location-detection functionality (such as a GPS receive) only in response to the detection of movement of the tracking device, can obtain location information, and can de-activate the location-detection functionality upon providing the location information to the tracking server. The tracking server can associate one or both of a previous location and the current location information based on movement of the tracking device.

19 Claims, 7 Drawing Sheets

Related U.S. Application Data continuation of application No. 16/241,858, filed on Jan. 7, 2019, now Pat. No. 10,462,600, which is a continuation-in-part of application No. 15/947,207, filed on Apr. 6, 2018, now Pat. No. 10,349,203, which is a continuation of application No. 15/660,766, filed on Jul. 26, 2017, now Pat. No. 9,973,890, which is a continuation of application No. 15/472,281, filed on Mar. 29, 2017, now Pat. No. 9,749,791, which is a continuation of application No. 14/822,580, filed on Aug. 10, 2015, now Pat. No. 9,654,916.

(60) Provisional application No. 62/062,062, filed on Oct. 9, 2014.

(51) Int. Cl.
*H04L 67/52* (2022.01)
*H04L 9/40* (2022.01)
*H04W 12/10* (2021.01)
*H04L 67/51* (2022.01)
*H04W 12/06* (2021.01)
*H04W 64/00* (2009.01)
*H04L 29/06* (2006.01)

(52) U.S. Cl.
CPC ........ *H04W 12/06* (2013.01); *H04W 64/006* (2013.01); *H04L 63/12* (2013.01); *H04L 67/16* (2013.01); *H04W 12/10* (2013.01); *Y02D 30/70* (2020.08)

(56) References Cited

U.S. PATENT DOCUMENTS

| | | | |
|---|---|---|---|
| 7,502,972 B1 | 3/2009 | Chilukuri et al. | |
| 7,983,419 B2 | 7/2011 | Fan et al. | |
| RE42,996 E * | 12/2011 | Hyun | H04W 48/18 370/338 |
| 8,280,351 B1 * | 10/2012 | Ahmed | H04W 12/08 455/411 |
| 8,401,185 B1 | 3/2013 | Telang | |
| 8,538,028 B2 | 9/2013 | Yeap et al. | |
| 8,611,321 B2 | 12/2013 | Herrala et al. | |
| 8,817,712 B2 * | 8/2014 | Shin | H04W 4/00 370/329 |
| 8,839,386 B2 * | 9/2014 | Gilboy | H04W 12/0808 726/7 |
| 8,869,248 B2 * | 10/2014 | Moosavi | H04W 12/06 726/5 |
| 9,256,657 B1 | 2/2016 | Evenson et al. | |
| 9,357,348 B2 | 5/2016 | Evans et al. | |
| 9,525,971 B1 | 12/2016 | Vega et al. | |
| 9,654,916 B2 | 5/2017 | de la Broise | |
| 9,964,623 B1 | 5/2018 | de la Broise et al. | |
| 10,111,032 B2 | 10/2018 | Vega et al. | |
| 10,506,386 B1 | 12/2019 | de la Broise et al. | |
| 10,568,035 B1 | 2/2020 | Tong | |
| 10,575,138 B1 | 2/2020 | Klinkner et al. | |
| 10,757,676 B1 | 8/2020 | de la Broise et al. | |
| 10,992,797 B2 | 4/2021 | Klinkner et al. | |
| 2002/0061748 A1 * | 5/2002 | Nakakita | H04W 12/0609 455/435.1 |
| 2003/0028805 A1 * | 2/2003 | Lahteenmaki | H04W 12/08 726/6 |
| 2003/0181215 A1 * | 9/2003 | Cromer | H04W 48/16 455/515 |
| 2003/0207683 A1 * | 11/2003 | Lempio | H04M 1/72572 455/422.1 |
| 2003/0233458 A1 * | 12/2003 | Kwon | H04W 12/06 709/227 |
| 2004/0192352 A1 | 9/2004 | Vallstrom et al. | |
| 2004/0255137 A1 | 12/2004 | Mng | |
| 2006/0046689 A1 * | 3/2006 | Kim | H04W 12/06 455/406 |
| 2006/0072747 A1 | 4/2006 | Wood et al. | |
| 2006/0229896 A1 | 10/2006 | Rosen et al. | |
| 2007/0074019 A1 | 3/2007 | Seidel | |
| 2007/0113092 A1 * | 5/2007 | Nishida | H04L 9/32 713/171 |
| 2007/0167175 A1 * | 7/2007 | Wong | H04W 64/00 455/456.5 |
| 2007/0229350 A1 * | 10/2007 | Scalisi | G06F 21/83 342/350 |
| 2008/0143516 A1 | 6/2008 | Mock et al. | |
| 2008/0182592 A1 * | 7/2008 | Cha | H04L 63/107 455/456.3 |
| 2008/0186162 A1 | 8/2008 | Rajan et al. | |
| 2008/0287143 A1 | 11/2008 | Banks et al. | |
| 2008/0303901 A1 | 12/2008 | Variyath et al. | |
| 2009/0002188 A1 | 1/2009 | Greenberg | |
| 2009/0239502 A1 * | 9/2009 | Dempo | H04L 12/4011 455/411 |
| 2009/0323972 A1 | 12/2009 | Kohno et al. | |
| 2010/0064138 A1 | 3/2010 | Hwang et al. | |
| 2010/0164714 A1 * | 7/2010 | Buller | G08B 13/1427 340/539.32 |
| 2010/0199339 A1 * | 8/2010 | Kageyama | H04W 12/06 726/7 |
| 2010/0273452 A1 | 10/2010 | Rajann et al. | |
| 2011/0182250 A1 * | 7/2011 | Shin | H04W 4/00 370/329 |
| 2011/0231092 A1 | 9/2011 | Kuo et al. | |
| 2011/0273334 A1 * | 11/2011 | Karr | G01S 13/825 342/378 |
| 2012/0042363 A1 * | 2/2012 | Moosavi | H04W 12/06 726/5 |
| 2012/0154115 A1 | 6/2012 | Herrala | |
| 2012/0218078 A1 * | 8/2012 | Hill | H04W 12/0609 340/5.82 |
| 2012/0309422 A1 | 12/2012 | Lewis-Evans et al. | |
| 2013/0069782 A1 | 3/2013 | Duggal et al. | |
| 2013/0152216 A1 | 6/2013 | Stevens | |
| 2013/0197859 A1 | 8/2013 | Albano et al. | |
| 2013/0217332 A1 * | 8/2013 | Altman | H04W 12/04 455/41.2 |
| 2014/0006129 A1 | 1/2014 | Heath | |
| 2014/0062695 A1 * | 3/2014 | Rosen | G08B 21/0219 340/539.13 |
| 2014/0085089 A1 | 3/2014 | Rasband et al. | |
| 2014/0162693 A1 | 6/2014 | Wachter et al. | |
| 2014/0189346 A1 | 7/2014 | Cureton | |
| 2014/0214855 A1 * | 7/2014 | Attaluri | G06F 16/2255 707/747 |
| 2014/0274135 A1 | 9/2014 | Edge et al. | |
| 2014/0274136 A1 | 9/2014 | Edge et al. | |
| 2014/0282974 A1 * | 9/2014 | Maher | H04L 9/3271 726/7 |
| 2014/0327518 A1 | 11/2014 | Loutit | |
| 2015/0006666 A1 | 1/2015 | Backholm et al. | |
| 2015/0052358 A1 | 2/2015 | Udupi et al. | |
| 2015/0086018 A1 | 3/2015 | Harjula et al. | |
| 2015/0160328 A1 | 6/2015 | Peinhardt et al. | |
| 2015/0168173 A1 | 6/2015 | Lewis-Evans et al. | |
| 2015/0237018 A1 | 8/2015 | Parry et al. | |
| 2015/0319151 A1 | 11/2015 | Chastain et al. | |
| 2016/0105764 A1 | 4/2016 | Evans et al. | |
| 2016/0105765 A1 | 4/2016 | Farley et al. | |
| 2016/0105766 A1 | 4/2016 | de la Broise | |
| 2016/0154963 A1 | 6/2016 | Kumar et al. | |
| 2016/0241660 A1 * | 8/2016 | Nhu | H04L 67/26 |
| 2016/0323114 A1 | 11/2016 | Sulpizio | |
| 2017/0069014 A1 | 3/2017 | Minelli | |
| 2017/0085542 A1 | 3/2017 | Avanzi et al. | |
| 2017/0155514 A1 | 6/2017 | Schulz et al. | |
| 2017/0171180 A1 | 6/2017 | Forood et al. | |
| 2017/0250972 A1 | 8/2017 | Ronda et al. | |
| 2017/0324614 A1 | 11/2017 | de Barros Chapiewski et al. | |
| 2017/0338948 A1 | 11/2017 | Boehl et al. | |
| 2018/0115413 A1 | 4/2018 | King | |
| 2018/0293387 A1 | 10/2018 | Bar-El et al. | |

(56) References Cited

U.S. PATENT DOCUMENTS

| | | |
|---|---|---|
| 2018/0317266 A1 | 11/2018 | Britt et al. |
| 2018/0337778 A1 | 11/2018 | Scheiblauer et al. |
| 2019/0044708 A1 | 2/2019 | Dewan |
| 2019/0141474 A1 | 5/2019 | de la Broise |
| 2019/0245885 A1 | 8/2019 | Starink et al. |
| 2019/0312720 A1 | 10/2019 | Liu et al. |
| 2019/0340251 A1 | 11/2019 | Peddada et al. |
| 2019/0370271 A1 | 12/2019 | Christensen |
| 2020/0052905 A1 | 2/2020 | Mathias et al. |
| 2020/0107164 A1 | 4/2020 | Lopatin et al. |
| 2020/0259650 A1 | 8/2020 | Montemurro et al. |
| 2020/0259908 A1 | 8/2020 | Klinkner et al. |
| 2020/0404091 A1 | 12/2020 | Klinkner et al. |
| 2020/0410113 A1 | 12/2020 | Gryb et al. |
| 2021/0168979 A1 | 6/2021 | Yang et al. |

OTHER PUBLICATIONS

United States Advisory Action, U.S. Appl. No. 15/660,766, dated Dec. 18, 2017, two pages.

United States Office Action, U.S. Appl. No. 15/660,766, dated Oct. 26, 2017, 11 pages.

United States Office Action, U.S. Appl. No. 15/660,766, dated Aug. 25, 2017, 9 pages.

United States Office Action, U.S. Appl. No. 15/947,207, dated Feb. 4, 2019, 14 pages.

United States Office Action, U.S. Appl. No. 15/947,207, dated Nov. 16, 2018, 15 pages.

United States Office Action, U.S. Appl. No. 15/947,207, dated Sep. 14, 2018, 12 pages.

United States Office Action, U.S. Appl. No. 15/947,207, dated Jun. 28, 2018, 12 pages.

United States Office Action, U.S. Appl. No. 16/241,858, dated Apr. 18, 2019, 16 pages.

United States Office Action, U.S. Appl. No. 16/575,979, dated Aug. 6, 2020, 9 pages.

United States Office Action, U.S. Appl. No. 16/546,122, dated Jul. 13, 2021, 80 pages.

* cited by examiner

SECURE AND PRIVATE CLOUD BASED BROADCAST IDENTIFICATION

CROSS REFERENCE TO RELATED APPLICATIONS

This application is a continuation of U.S. application Ser. No. 16/575,979, filed Sep. 19, 2019, now U.S. Pat. No. 10,827,299, which is a continuation of U.S. application Ser. No. 16/241,858, filed Jan. 7, 2019, now U.S. Pat. No. 10,462,600, which application is a continuation-in-part of U.S. application Ser. No. 15/947,207, filed Apr. 6, 2018, now U.S. Pat. No. 10,349,203, which is a continuation of U.S. application Ser. No. 15/660,766, filed Jul. 26, 2017, now U.S. Pat. No. 9,973,890, which is a continuation of U.S. application Ser. No. 15/472,281, filed Mar. 29, 2017, now U.S. Pat. No. 9,749,791, which is a continuation of U.S. application Ser. No. 14/822,580, filed Aug. 10, 2015, now U.S. Pat. No. 9,654,916, which application claims the benefit of U.S. Provisional Application No. 62/062,062, filed Oct. 9, 2014, all of which are incorporated by reference in their entirety.

BACKGROUND

This disclosure relates generally to locating a tracking device, and more specifically, to securely providing location and identity information for a tracking device to centralized system.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost).

However, traditional tracking devices and corresponding systems suffer from one or more disadvantages. For example, locating a tracking device from a far-away distance requires a considerable amount of power. Thus, battery life of a tracking device is often limited. Further, technology for long-range tracking is expensive, and often requires sophisticated circuitry for operating in connection with an associated electronic device (e.g., a mobile device). Additionally, low-power options for tracking devices are limited to tracking nearby objects that require a user to be within a close proximity of the tracking devices, limiting the usefulness of such tracking devices.

SUMMARY

A tracking device can securely communicate with a secondary device, such as a mobile phone or computer, using a one-way communication protocol. For instance, the tracking device can generate a hash value based on the identity of the tracking device, a key stored by the tracking device, a time interval during which the hash value is generated, or any other tracking device parameters. The tracking device can output the generated hash value, for instance as a Bluetooth-format advertisement or broadcast.

The secondary device can receive the hash value, and can attempt to resolve the received hash value by generating a hash value using the same device parameters for each of one or more tracking devices associated with, or "owned" by, the secondary device. If a generated hash value matches the received hash value, the secondary device can determine a location of the tracking device (such as a location of the mobile device if the mobile device is within a threshold proximity of the tracking device), and can provide the identity of the tracking device and the determined location to a tracking server (such as a cloud server).

If the secondary device cannot resolve the received hash value, the secondary device can provide the location of the tracking device and the received hash value to the tracking server for resolution. The tracking server can generate a hash value using the same device parameters for each tracking device associated with the tracking server, and can resolve the received hash value by matching it to a hash value generated by the tracking server. By resolving the received hash value, the tracking server can identify the tracking device, and can store the received location in association with the identity of the tracking device.

To save power, the secondary device can activate location-detection functionality, such as a GPS receiver, in response to the detection of movement by the tracking device, for instance using a gyroscope or accelerometer. The secondary device can then access location information associated with the tracking device, and can provide the identity of the tracking device and the location information to the tracking server for storage. The secondary device can de-activate the location-detection functionality in response to providing the location and tracking device identity to the tracking server, or in response to receiving a confirmation from the tracking server that the location information was stored in association with the tracking device identity. The tracking device can enter a standby mode, and the location-detection functionality of the secondary device can remain de-activated, until subsequent movement of the tracking device is detected.

The tracking device can emit a location request either in response to the detection of movement by the tracking device, at a fixed interval, or in response to a request from a secondary device. The tracking device can include a time stamp within the location request indicating a time associated with the last detected movement of the tracking device. If the secondary device receives a location request with an indication that the tracking device has not moved since a high-accuracy location has been associated with the tracking device, the secondary device maintains the high-accuracy location with the tracking device, regardless of whether the secondary device has moved relative to the tracking device. If the secondary device receives a location request with an indication that the tracking device has moved since a high-accuracy location has been associated with the tracking device, the secondary device can associate the location of the secondary device with the tracking device, even if the secondary device has moved more than a threshold distance associated with high-accuracy location determinations away from the tracking device. Alternatively, the secondary device can maintain the previous high-accuracy location association with the tracking device, but because the tracking device has moved, the secondary device can instead classify the location as a low-accuracy location.

A type, direction, or magnitude of motion ("movement information") can be determined and provided to the secondary device. The secondary device can access location information associated with the tracking device in response to receiving the movement information, and can provide the location information, the movement information, and the identity of the tracking device to the tracking server. The tracking server can select one or both of the provided location information or previously provided location information based on, for instance, the movement information, the accuracy of the provided location information or the previously provided location information, or any other suitable factor. The selected location information can be stored by the tracking server and/or provided to the secondary device for storage or presentation to a user of the secondary device. For instance, the tracking server, upon determining that the received location information is more accurate than the previously provided location information, can overwrite the previously provided location information with the received location information. The tracking device can enter a standby mode upon receiving a confirmation that the location information was provided to the tracking server, that the tracking server stored the provided location information, or that the tracking server provided the selected location information to the mobile device, and can remain in standby mode until subsequent motion is detected.

Figure 1:
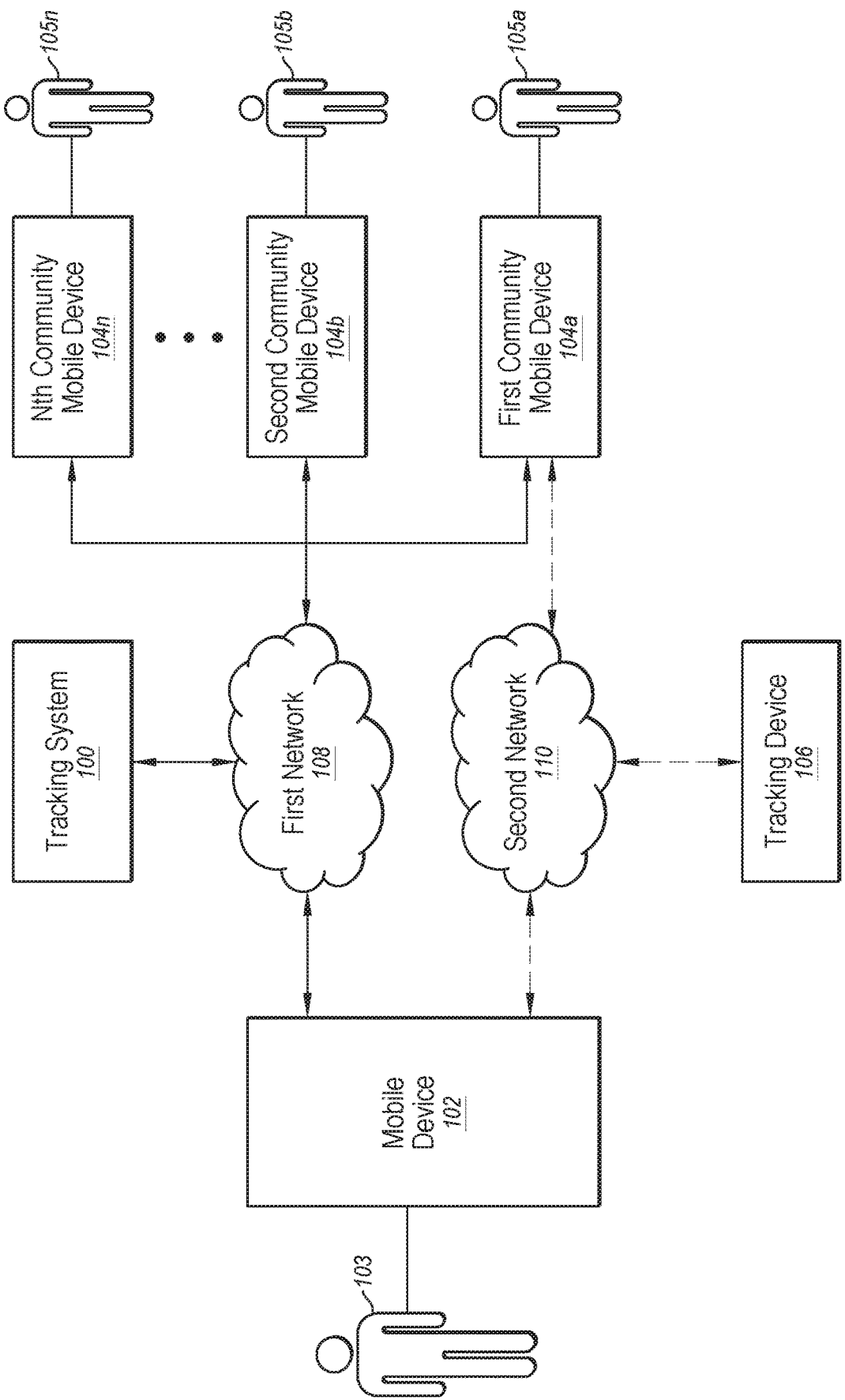
FIG. 1 illustrates an exemplary implementation for locating a tracking device according to principles described herein.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments described herein provide a user with the ability to locate one or more low-power tracking devices by leveraging the capabilities of a plurality of mobile devices associated with a community of users (e.g., users of the same tracking device system) in a secure and privacy-focused environment.

A user can attach a tracking device to or enclose the tracking device within an object, such as a wallet, keys, a car, a bike, a pet, or any other object that the user wants to track. The user can then use a mobile device (e.g., by way of a software application installed on the mobile device) to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the principles described herein allow the user to leverage the capabilities of a community of users of a tracking device system.

In particular, a tracking system (also referred to herein as a "cloud server" or simply "server") can maintain user profiles associated with a plurality of users of the system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate and track down the tracking device.

In addition to utilizing a general community of users, a user of the tracking system may desire to utilize the tracking capabilities of a specific group of one or more known users (e.g., friends or family of the user). For example, a user may indicate one or more friends or other users with which a tracking device may be shared. Sharing the tracking device may provide the ability for a friend to quickly determine if a tracking device is close-by without also querying a larger community of users, or to enable a friend to contact a user directly with information about the location of a lost tracking device.

Environment Overview

FIG. 1 illustrates an exemplary implementation in which a tracking system 100 is communicatively coupled to a mobile device 102 associated with the user 103 and a plurality of community mobile devices 104a through 104n (collectively referred to herein as "community mobile devices 104") associated with a plurality of users 105a through 105n of the tracking system 100 (collectively referred to herein as "community users 105"). As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. Accordingly, the mobile device 102 and community mobile devices 104 are only able to communicate with the tracking device 106 if they are within a close proximity to the tracking device. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 116. For example, an implementation may include a first community mobile device 112a associated with a first community user 116a, a second community mobile device 112b associated with a second community user 116b, and additional communication mobile devices associated with additional community users up to an nth community mobile device 112n associated with an nth community user 116n. The community mobile devices 112 may also include functionality that enables each community mobile device 112 to identify a tracking device 106 within a proximity of the community mobile device 112. In one example, a first community mobile device 112a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may constantly transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102. In some cases, the strength of signal or absence of a signal may be used to indicate that a tracking device 106 is lost.

System Overview

Figure 2:
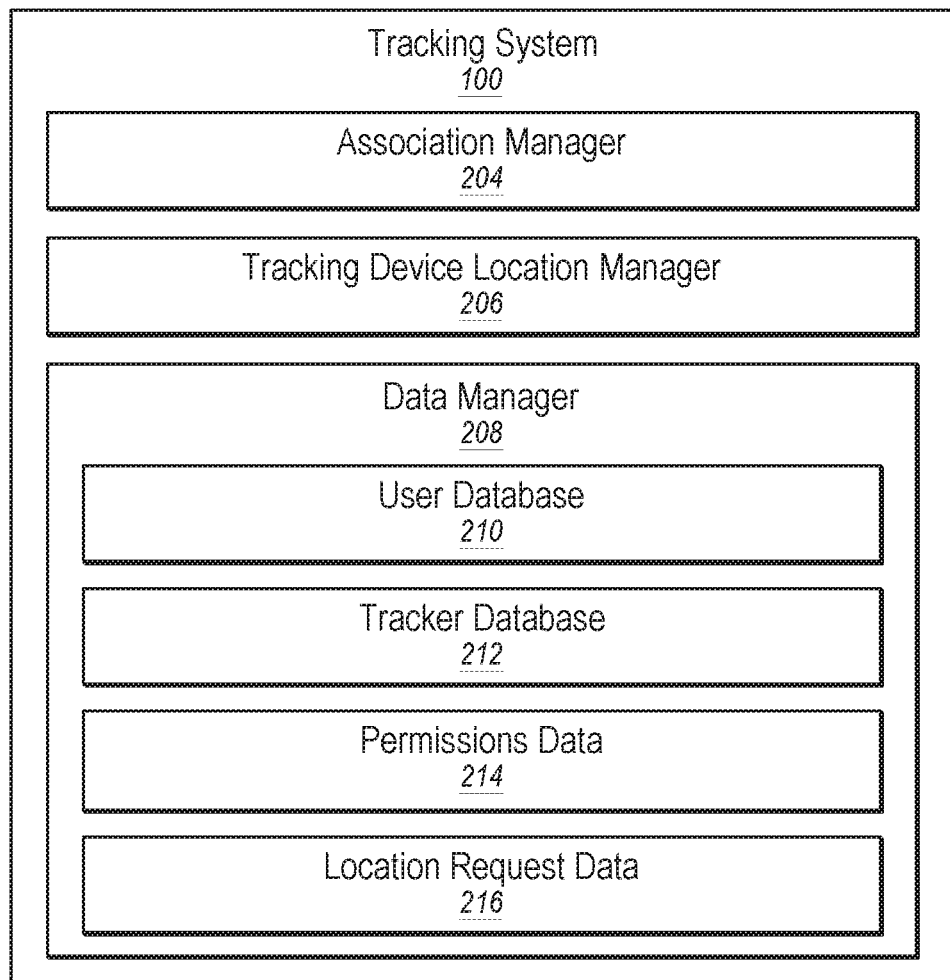
FIG. 2 illustrates an exemplary tracking system of the implementation of FIG. 1.

FIG. 2 illustrates a diagram showing example components of the tracking system 100. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106. The tracking device location manager 206 may also be used to receive and process a response to a tracking request that is received from one or more community mobile devices 104 that detect the tracking device 106 and respond to the tracking request. For example, the tracking system 100 may receive a response to the tracking request indicating a location within a proximity of the tracking device 106 and provide a last known location within a proximity of the tracking device 106 as provided by the community mobile device 104.

In one configuration, the tracking device location manager 206 may receive an indication that a tracking device 106 is lost from the mobile device 102 and store the lost indication on a database. When the tracking device location manager 206 receives an indication that the tracking device 106 is lost, the tracking device location manager 206 may set a flag indicating that the tracking device 106 is lost. Setting a flag for a tracking device 106 may include storing and/or associating a value associated with the tracking device that indicates that the tracking device 106 is lost. This may include setting a flag, marker, digital value, or other indication that the tracking device 106 is lost and maintaining or storing the indication of the lost tracking device 106 on the tracking system 100 (e.g., on a database).

The tracking device location manager 206 may further receive updated locations from the community of mobile devices 104 that are constantly scanning for nearby tracking devices 106. In this example, the tracking device location manager 206 may receive location updates from the community of mobile devices 104 and, based on the tracking device 106 being indicated as lost, provide a response to a lost indication to the mobile device 102. The response to the lost indication may be a text message, push notification, ring tone, automated voice message, or other response for informing a user 103 that a tracking device 106 has been found and/or an updated location of the tracking device 106.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting a proximity of the tracking device 106. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate a tracking device 106 using an account and/or mobile device 102 associated with the user 103. Location request data 216 may include information related to a location request or a lost indication received from the user 103 via a mobile device 102.

Figure 3:
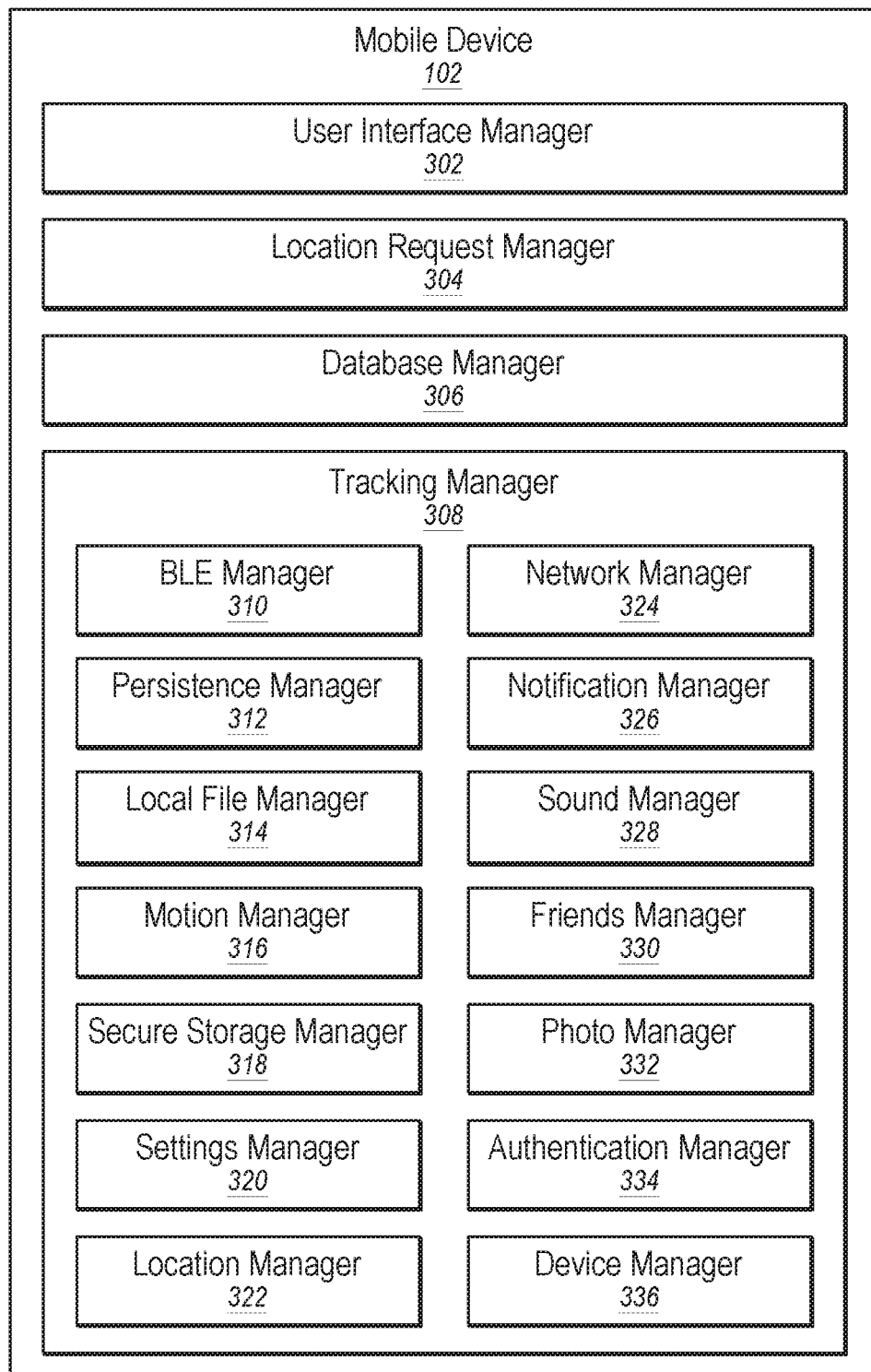
FIG. 3 illustrates an exemplary user mobile device of the implementation of FIG. 1.

FIG. 3 illustrates a diagram showing example components of the mobile device 102. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
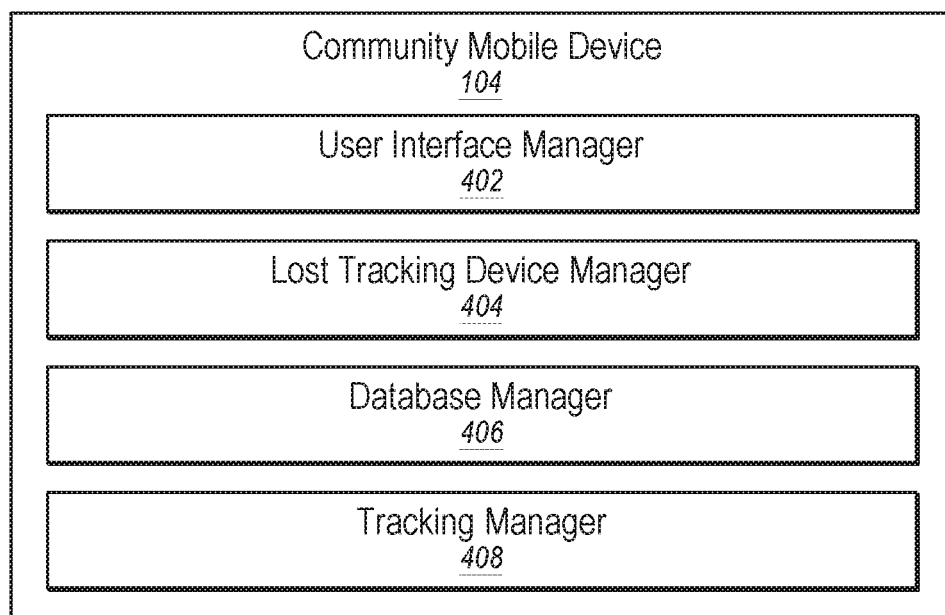
FIG. 4 illustrates an exemplary community mobile device of the implementation of FIG. 1.

FIG. 4 illustrates a diagram showing example components of a community mobile device 104. As shown, the community mobile device 104 may include, but is not limited to, a user interface manager 402, a lost tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a lost tracking device manager 404. The lost tracking device manager 404 may facilitate scanning for nearby tracking devices 106. In some configurations, the lost tracking device manager 404 can continuously or periodically scan (e.g., once per second) for nearby tracking devices 106. The lost tracking device manager 404 may determine whether to provide an updated location of the nearby tracking device 106 to the tracking system 100. In some configurations, the lost tracking device manager 404 provides a location of a nearby tracking device 106 automatically. Alternatively, the lost tracking device manager 404 may determine whether the location of the tracking device 106 has been recently updated, and determine whether to provide an updated location based on the last time a location of the tracking device 106 has been updated (e.g., by the community mobile device 104). For example, where the community mobile device 104 has provided a recent update of the location of a tracking device 106, the lost tracking device manager 404 may decide to wait a predetermined period of time (e.g., 5 minutes) before providing an updated location of the same tracking device 106.

In one configuration, the lost tracking device manager 404 may receive and process a location request or other information relayed to the community mobile device 104 by the tracking system 100. For example, the lost tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the lost tracking device manager 404 may generate and transmit a response to the location request to the tracking system 100, which may be provided to the user 103 associated with the lost tracking device 106. Further, generating and transmitting the response to the tracking request may be conditioned on the status of the tracking device 106 being flagged as lost by the mobile device 102 and/or the tracking system 100.

The lost tracking device manager 404 may additionally provide other information to the tracking system 100 in response to receiving the tracking request. For example, in addition to providing a location of the community mobile device 104, the lost tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the lost tracking device manager 404 may determine whether to send a location within the proximity of the tracking device 106 to the tracking system 100. The determination of whether to send a location to the tracking system 100 may be based on a variety of factors. For example, a lost tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Hash-Based Location Tracking

Often, identifying and tracking the location of wireless devices requires the establishment of a two-way communication session between the device being tracked (the "tracking device") and another device (such as a mobile phone, computer, or any other suitable device, "mobile device" hereinafter). As described herein, a tracking device can instead be identified using one-way communications (communications from the tracking device to the mobile device), without requiring communications from the mobile device to the tracking device. Such communications are referred to as "advertisements" by the tracking device, and can be secured by the tracking device to prevent interception by unauthorized entities, for instance entities masquerading as an associated mobile device or entities eavesdropping on tracking device advertisements to collect information about the tracking device.

A tracking device (such as the tracking device 106 of FIG. 1) can be configured to generate a hash value identifying the tracking device. The hash value can be dependent on one or more parameters associated with the tracking device, including but not limited to one or more of the following: a key stored by the tracking device, the MAC address of the tracking device (random or assigned to the tracking device by a tracking server, such as the tracking system 100 of FIG. 1), a device identifier (such as a persistent identifier that uniquely identifies the tracking device), a time at which the hash value is generated, or any other suitable parameters. By generating a hash value based on a time at which the hash value is generated, the hash value can expire after a threshold amount of time elapses, or after the passage of a pre-defined time interval, as described below.

In some embodiments, the generated hash value is represented by the function:

$$hash\_value = f(tracking\_device\_key, tracking\_device\_identifier, time)$$

The tracking device can generate a hash value (or, in some embodiments, a keyed-hash value) using any suitable hashing function, such as the SHA-X function, the MDX function, the RIPEMD function, the PANAMA function, the Tiger function, the WHIRLPOOL function, the Bernstein hash function, the Fowler-Noll-Vo hash function, the Jenkins hash function, the Pearson hash function, the Zobrist hash function, and the like. A keyed-hash message authentication code (HMAC) construction can be used for calculating the keyed-hash. Although hash functions are described herein, in other embodiments, the tracking device is configured to generate an encrypted or otherwise encoded value based on one or more device parameters using any suitable encryption or encoding function. The parameter "tracking_device_key" refers to a key stored by the tracking device, the parameter "tracking_device_identifier" refers to an identifier that uniquely identifies the tracking device, and the parameter "time" refers to the time interval or period during which the hash value is generated.

Figure 5:
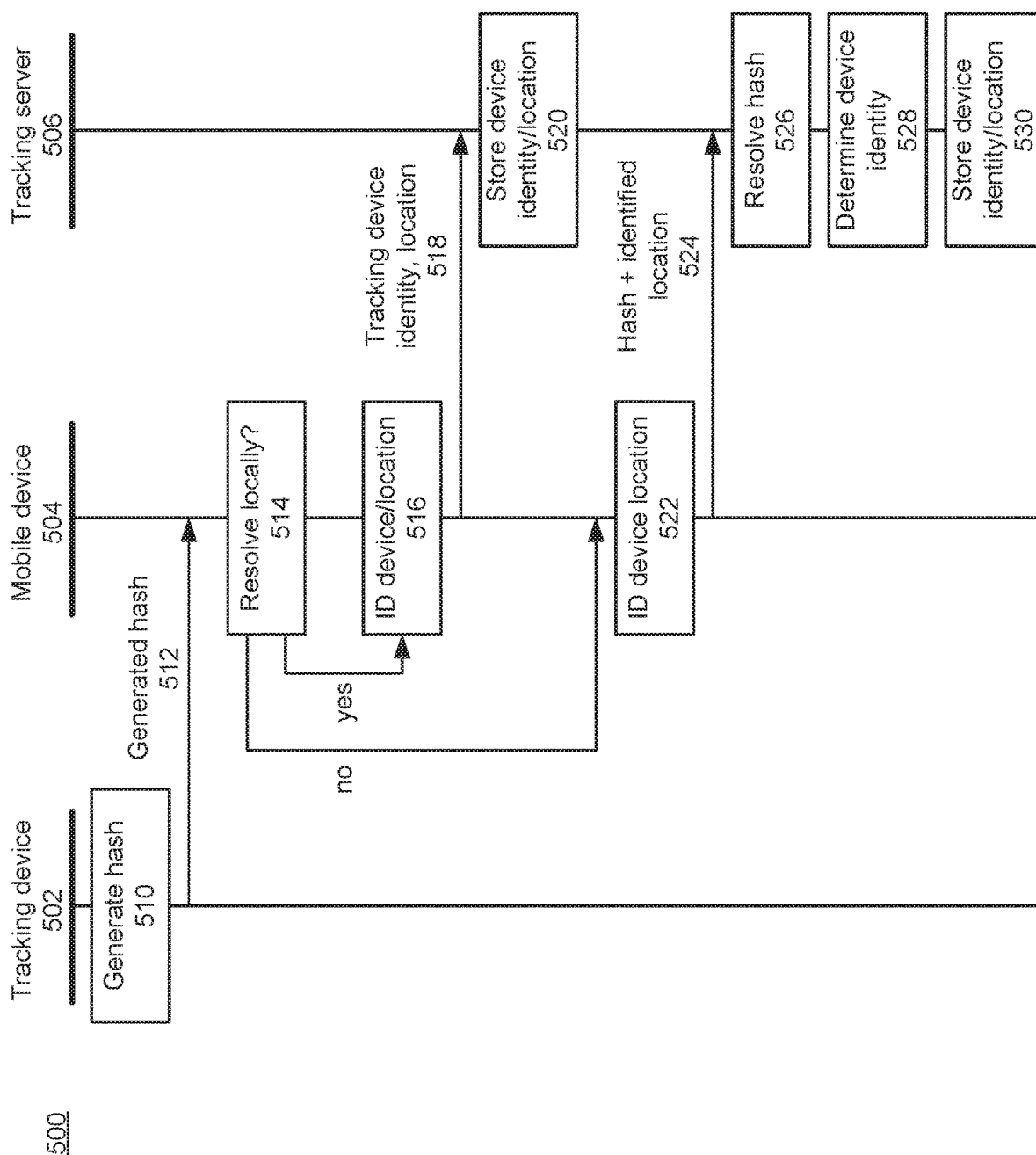
FIG. 5 illustrates a process of identifying a tracking device and an associated location, according to one embodiment.

FIG. 5 illustrates a process 500 of identifying a tracking device and an associated location, according to one embodiment. A tracking device 502 generates 510 a hash value based on one or more tracking device parameters, such as an assigned tracking_device_key, a persistent tracking device unique identifier, and a time or time interval during which the hash value is generated. The tracking device 502 can generate a new hash value periodically, after the passage of a pre-determined interval of time, in response to detected movement of the tracking device, or in response to any other suitable stimulus.

The generated hash value 512 is advertised or broadcasted, for instance using the Bluetooth protocol, and is received by the mobile device 504. In some embodiments, the tracking device 502 advertises the hash value periodically, a threshold number of times per generated hash value, in response to generating the hash value, or based on any other suitable criteria. It should be noted that the generated hash 512 can advertised independent of or without communications from the mobile device 504.

The mobile device 504 receives the hash value and determines 514 whether the hash value can be resolved locally. To resolve a hash value locally, the mobile device 504 accesses a set of stored parameters for each tracking device associated with or "owned by" the mobile device 504 (such as a tracking device key and/or tracking device identifier assigned to the mobile device by a tracking server 506), and generates a hash value for each owned tracking device using the same hash function and tracking device parameters as the tracking device 502. If the received hash value matches any hash value generated by the mobile device 504, the mobile device 504 identifies the tracking device 502 as the tracking device associated with the matched hash value, identifies the location of the tracking device 502, and provides the tracking device identity and location 518 to the tracking server 506. The tracking server 506 stores 520 the received tracking device identity in association with the received tracking device location.

If none of the hash values generated by the mobile device 504 match the received hash value, or if the mobile device 504 does not have access to device parameters for tracking devices owned by the mobile device 504, the mobile device 504 identifies 522 the location of the tracking device 502, and forwards the received hash value and the identified location 524 to the tracking server 506. The tracking server 506 resolves 526 the hash value by generating a hash value for each tracking device tracked by or associated with the tracking server 506 using associated device parameters maintained by the tracking server 506. The tracking server 506 identifies 528 the tracking device 502 by matching the received hash value to a hash value generated by the tracking server 506. Upon identifying the tracking device 502, the tracking server 506 stores 530 the received location in association with the identity of the tracking device 502.

The tracking server 506 can be configured to pre-generate hash values for each tracking device associated with the tracking server 506, and to store the pre-generated hash values in, for example, a hash table. For instance, for hash values generated using, as one tracking device parameter, the hour interval (such as 10:00 am-11:00 am PDT) during which the hash value is generated, the tracking server 506 can generate hash values for each tracking device associated with the tracking server 506 every hour. If a hash value generated in a previous hour interval is received at the tracking server 506, the tracking server 506 may not be able to resolve the hash value using hash values generated during a current hour interval. In such instances, the received hash value has "expired", and the tracking server 506 ignores the expired hash value, waits for a subsequent/non-expired hash value from the tracking device 502 (via the mobile device 504), and resolves the subsequent hash value. It should be noted that although examples are given with regards to hour intervals, hash values can be generated an expire with regards to any time interval, such as the 5-minute interval, the 15-minute interval, the 6-hour interval, the 24-hour interval, and the like.

In order to synchronize maintained times between the tracking device 502, the mobile device 504, and the tracking server 506, the tracking device 502 can authenticate the mobile device 504 and/or tracking server 506, and can synchronize a timing tracker at the tracking device 502 in response to the authentication. Alternatively, the tracking device 502 can synchronize a timing tracker at the tracking device 502 using an external entity, in response to the manual synchronization of the timing tracker by a user, or using any other suitable synchronization means. In some embodiments, the mobile device 504 can determine that a tracking device 502 is out of synch by resolving an expired hash value received from the tracking device and determining that the resolved hash value has expired. In response to determining that the tracking device 502 is out of synch, the mobile device 504 can trigger a re-synchronization by connecting to the tracking device and updating the tracking device's timing information. In some embodiments, re-synchronization occurs during a grace period, for instance a threshold period of time after new hash values associated with a time interval are generated.

The hash function used by the tracking device 502 can produce hash values of any suitable size or length. In some embodiments, the length of the hash value or the type of hash function is selected based on available power, time, or any other characteristic of the tracking device 502 or tracking server 506. In some embodiments, the length of the hash value is selected based on a pre-determined acceptable collision rate. Collisions occur when the tracking server 506 generates the same hash value for two or more tracking devices during a particular time interval. Collisions can be resolved by comparing a previous known/stored location for each tracking device associated with the collision and the received location associated with the received hash value. For instance, if a previous known/stored location for a particular tracking device associated with a collision is within a threshold distance of a received location, the tracking device 502 can identify the particular tracking device from among the tracking devices associated with the collision as the tracking device associated with the received location. In some embodiments, the tracking server 506 can simply ignore received hash values associated with collisions until a new hash value generated during a subsequent time interval is received, and can resolve the new hash value accordingly.

It should be noted that in some embodiments, the hash values described herein are included within a communication packet that also includes other types of data. For instance, a packet can include a hash value and one or more of: information describing a broadcast power by the tracking device 502, a time of communication, an identity of the mobile device 504 associated with the tracking device, an identity of a user associated with the tracking device, a digital signature for use in verifying the identity of the tracking device or the authenticity of the communication packet, or any other suitable information.

In some embodiments, the "time" variable in the hash function described above is an incremented time interval value. For example, the value of the time variable for the first 15 minute interval of a calendar year is "00001", the value of the time variable for the second 15 minute interval is "00002", and so forth. In order to align the value of the time variable used in computing the hash value, the tracking device 502 can include the value of the time variable in plaintext in a header of an advertisement packet that includes the hash value. In such embodiments, a mobile device 504 or tracking server 506 can parse the value of the time variable included within the header, and can compute hash values for tracking devices associated with the mobile device or tracking server using the parsed value of the time variable for comparison with the hash value included within the advertisement packet.

For collisions, in addition to using the geographic location of the tracking device to resolve collisions between hash values, the geographic location of or associated with a user can be used. For example, if a first hash value is associated with a first tracking device and a second hash value is associated with a second tracking device, a collision between the first hash value and the second hash value can be resolved by determining that the location of the mobile device from which each hash value was received is within a threshold distance of a geographic location associated with an owner of the first tracking device, and by selecting the first tracking device as associated with the received hash value.

Likewise, collisions between hash values can be resolved by using account information associated with tracking device users. For instance, if a user is associated with a user account that is in turn associated with a mobile device, and a hash value associated with a collision was received from the mobile device, a tracking device associated with the mobile device can be selected as associated with the hash value. Further, a hash value collision can be resolved based on a most recent incremented "time" variable value associated with each tracking device associated with the hash value collision. For instance, if a first hash value is associated with a first tracking device from which a hash value generated using the time value "00034" was recently received, if a second hash value is associated with a second tracking device from which a hash value generated using the time value "29531" was recently received, and if the hash values associated with the hash value collision are generated using the time values "00035" and "14224", the first tracking device can be selected as associated with the received hash value since "00034" is closer to "00035" than "29531" is to "00035" or "14224". In other words, a tracking device can be selected based on how proximal or close an incremented time or counter value associated with a collision is to a time or counter value recently used by a tracking device associated with the collision, without requiring the transmission of the incremented value itself.

In some embodiments, the tracking server 506 attempts to resolve collisions first using user account information as described above. In the event that the collision cannot be resolved using account information, the tracking server attempts to resolve the collision using proximity of incremented time or counter values recently used by a tracking device in generating a hash value to time or counter values used to generate hash values associated with a collision. In the event that the collision still cannot be resolved, the tracking server can then attempt to resolve the collision using a proximity of a geographic location of a mobile device, tracking device, or user to a tracking device associated with a collision.

Replay attacks, or the use of a hash value intercepted by an unauthorized entity to attempt to authenticate a tracking device, can be avoided by tracking incremented time or counter values associated with a tracking device. For instance, when a hash value is received from a tracking device, the tracking server 506 can update a stored time/counter value associated with the tracking device. When a subsequent hash value is received that is associated with a lower or earlier time/counter value, the tracking server can disregard the hash value and can deny a request to authenticate the tracking device.

In embodiments where each time or counter value used to generate a first hash value is associated with a particular time interval (e.g., 15 minutes), the tracking server can deny a request to authenticate a tracking device from which a subsequent hash value is received based on the same time or counter value if the subsequent hash value is received outside of the time interval (for instance, continuing with the previous example, if the subsequent hash value is received 20 minutes after the first hash value is received). The tracking server can increment tracked time or counter values for a tracking device based on an amount of time that has lapsed since a hash value associated with a tracked time or counter value was received. Thus, if a hash value is received from a tracking device that is generated using a time or counter value outside of an expected range for the tracking device (e.g., a time or counter value occurring before a tracked time or counter value for the tracking device, or occurring more than a threshold distance beyond from a tracked time or counter value incremented by the tracking server), the tracking server can disregard the received hash value and/or deny a request to authenticate a corresponding tracking device.

Motion-Activated Location Determination

To determine the location of a tracking device, such as the tracking device 106 of FIG. 1, the tracking device emits a location-request beacon or advertisement signal (location request). In response to receiving the beacon or advertisement signal, a mobile device, such as the mobile device 104 of FIG. 1, uses location-determining functionality (such as a GPS receiver) to determine the location of the mobile device. Being in close proximity with the tracking device, the location of the mobile device is associated with the tracking device. However, the use of location-determining functionality by the mobile device is often very power-consuming, resulting in the draining of the mobile device's battery or other power source.

To offset the drain of power by the location-determining functionality of the mobile device, the tracking device can be configured to emit a location request only in response to the detection of movement by the tracking device. When the tracking device is not moving, the location of the tracking device doesn't change, and a previous determined location (determined in response to the detection of a previous movement) is sufficient to describe the location of the tracking device.

In other embodiments, the tracking device is configured to emit a location request either in response to the detection of movement by the tracking device, at a fixed interval, or in response to a request from a mobile device. In such embodiments, the tracking device can include a time stamp within the location request indicating a time associated with the last detected movement of the tracking device. In response to receiving a location request from the tracking device by a mobile device, the mobile device can determine based on the time associated with the last detected movement of the tracking device if the tracking device has moved since the last time a high-accuracy location was determined for the tracking device. For instance, if a tracking device is within a threshold distance from the mobile device when the mobile device receives a location request, the mobile device can associate the tracking device with the location of the mobile device, and can determine that the associated location is a "high-accuracy" location.

If the mobile device subsequently moves more than the threshold distance away from the tracking device and receives a location request, and if the location request includes a timestamp indicating that the tracking device hasn't moved since the mobile device associated the tracking device with the location of the mobile device from within a threshold distance from the tracking device, then the mobile device can maintain the association between previous location and the tracking device as a high-accuracy location. On the other hand, if the location request includes a timestamp indicating that the tracking device has since moved, the mobile device can associate the location of the mobile device with the tracking device, though because the distance between the mobile device and tracking device is greater than the threshold distance, the associated location is maintained as a low-accuracy location. It should be noted that in some embodiments, the location request can include an indication of movement magnitude. In such embodiments, the mobile device can determine that a previous high-accuracy location is still a high-accuracy location if the magnitude of movement is below a movement threshold. Alternatively, if the movement is greater than the movement threshold, the mobile device can determine that the previous high-accuracy location is now a low-accuracy location, or can associate the new location of the mobile device with the tracking device as a low-accuracy location.

In some embodiments, the threshold distance described above is a distance such that the tracking device sends communications to the mobile device, but such that the mobile device cannot send communications to the tracking device (in other words, the tracking device is outside of the range of the mobile device). In some embodiments, the threshold distance is a pre-determined distance such that location information of the mobile device and associated with the tracking distance is above a threshold accuracy (a "high-accuracy" location) when the mobile device is within the threshold distance of the tracking device and is below a threshold accuracy (a "low accuracy" location) when the mobile device is outside the threshold distance from the tracking device. In some embodiments, the location request from the tracking device includes an indication of strength of transmission power. In such embodiments, the indicated strength of transmission power can be used to determine if the mobile device is within the threshold distance of the mobile device.

The tracking device can include one or more movement-detection mechanisms. For example, the tracking device can include a gyroscope, an accelerometer configured to detect movement along one or more axes, an acoustic motion sensor, a vibration sensor, a spring-based motion detector, or any other suitable mechanism. In some embodiments, the type of motion detection implemented within the tracking device can be basic, as the mere detection of motion in any form can be sufficient to trigger a location request. In such embodiments, rudimentary and/or low-power motion detectors can be implemented within the tracking device, beneficially reducing the cost of and/or power used by the tracking device.

Figure 6:
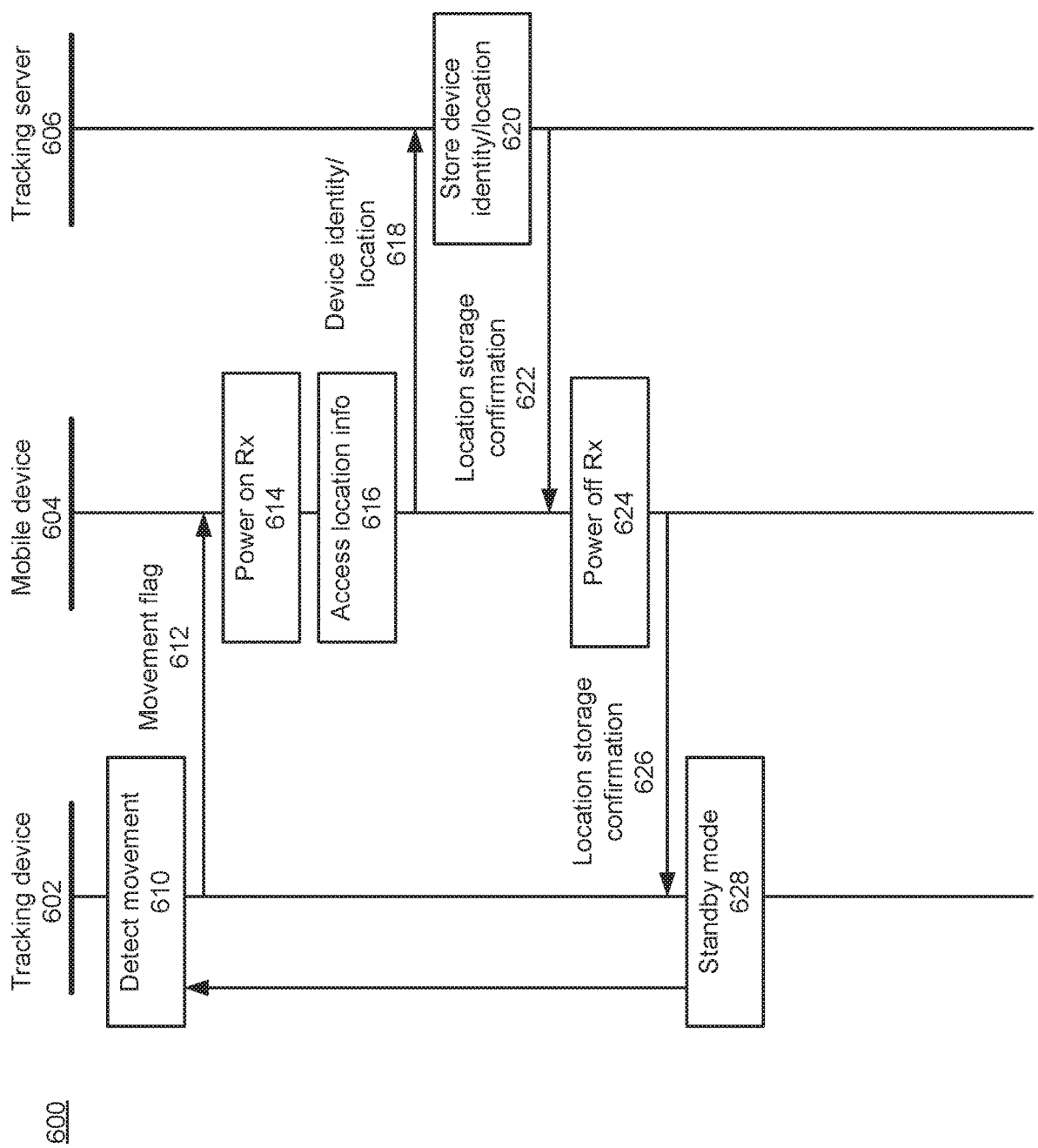
FIG. 6 illustrates a process of determining device location in response to movement detection, according to one embodiment.

FIG. 6 illustrates a process 600 of determining device location in response to movement detection, according to one embodiment. A tracking device 602 detects 610 movement using, for instance, one or more motion-detection devices within the tracking device 602. In response to detecting the movement, the tracking device 602 sends a movement flag 612 or other indication of the movement to a mobile device 604. In response to receiving the movement flag 612, the mobile device powers on 614 a location-detection receiver, such as a GPS receiver, and accesses location information associated with the location of the mobile device 604 (and, due to the proximity of the tracking device 602 to the mobile device 604), the location of the tracking device 602.

The mobile device 604 provides the identity and location 618 of the tracking device 602 to the tracking server 606. The tracking server stores 620 the received location in association with the identity of the tracking device 602, and provides a confirmation 622 of the storage of the received location to the mobile device 604. In response to receiving the storage confirmation 622, the mobile device 604 powers off the location-detection receiver. It should be noted that in embodiments where the mobile device 604 does not receive the confirmation 622 from the tracking server 606, the mobile device 604 can re-send the tracking device identity and location to the tracking server 606. In some embodiments, the mobile device 604 can power off the receiver immediately after providing the tracking device identity and location to the tracking server 606.

The mobile device 604 provides confirmation 626 of the storage of the tracking device location by the tracking server 606 to the tracking device 602. In response to receiving the confirmation 626, the tracking device 602 enters standby mode 628 until subsequent movement is detected. In embodiments where the tracking device 602 does not receive the confirmation 626, the tracking device 602 can re-send the movement flag 612 to the mobile device 604. In some embodiments, the mobile device 604 provides confirmation of providing the tracking device identity and location to the tracking server 606 to the tracking device 602 without waiting to receive the confirmation 622 that the location was stored from the tracking server 606, and in response, the tracking device 602 can enter the standby mode 628. By only powering on the location-detection receiver in response to the detection of movement by the tracking device 602, the mobile device 604 saves power that would otherwise be required to power on the location-detection receiver during periods of time when the tracking device 602 is not moving.

Figure 7:
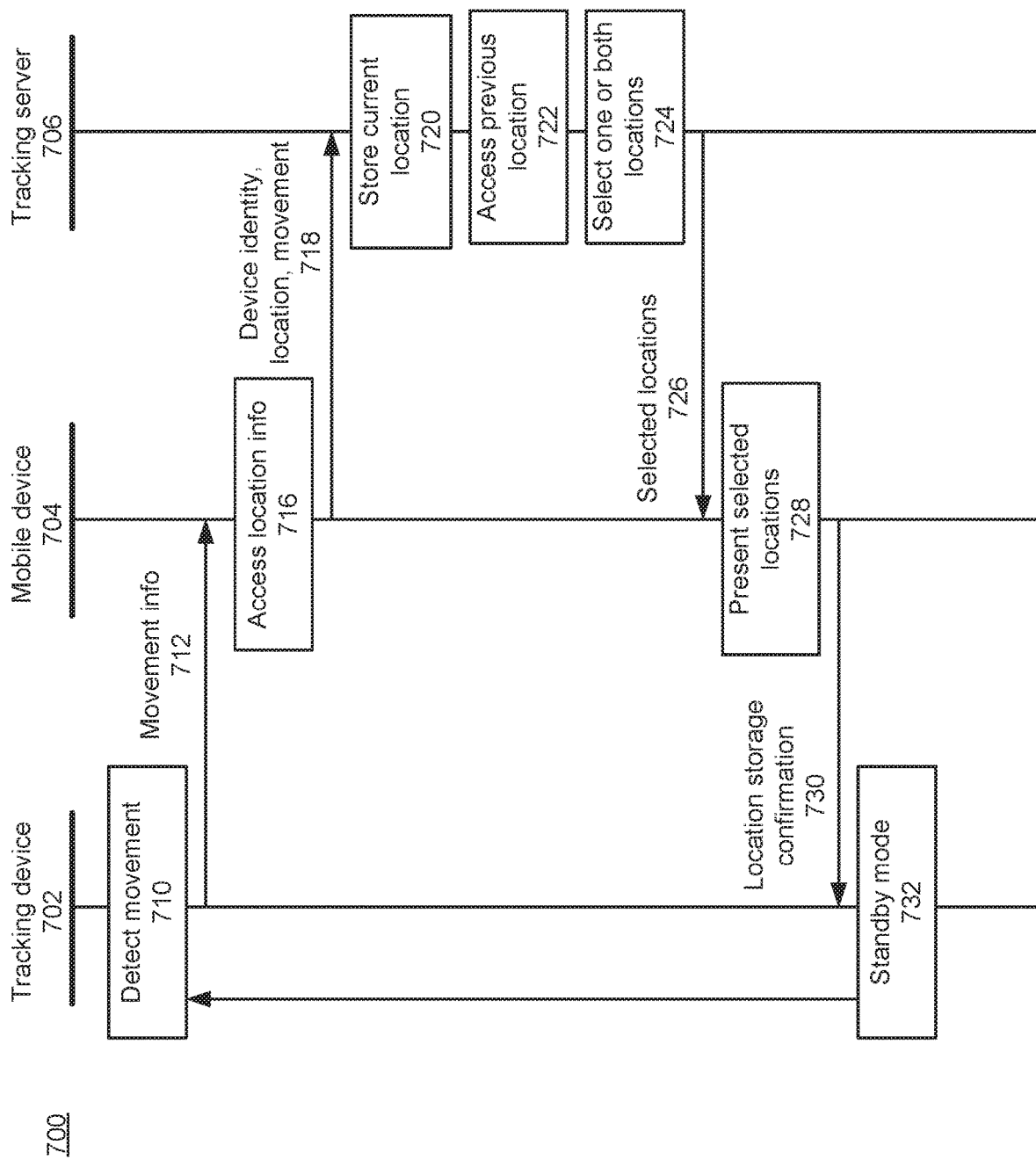
FIG. 7 illustrates a process of selecting between current or previous device location information, according to one embodiment.

FIG. 7 illustrates a process 700 of selecting between current or previous device location information, according to one embodiment. The tracking device 702 detects 710 movement, for instance using one or more location-detection devices as described above. In response, the tracking device 702 provides movement information 712 to the mobile device 704. The movement information 712 can include, for instance, a magnitude of detected movement.

In response to receiving the movement information 712, the mobile device 704 accesses location information 716, for instance using location-detection mechanisms, as described above. Although not illustrated in FIG. 7, the mobile device 704 can implement the power-saving process of FIG. 6 by powering on the location-detection mechanisms of the mobile device 704 only in response to receiving the movement information 712.

The mobile device 704 provides the identity, location, and movement information 718 of the tracking device 702 to the tracking server 706. The tracking server 706 stores 720 the received location in association with the tracking device 702 as the current location of the tracking device. The tracking server 706 accesses 722 a previous location associated with the tracking device 702 stored by the tracking server 706.

The tracking server 706 then selects one or both of the current location and the previous location of the tracking device 702 for providing to the mobile device 704. In some embodiments, the tracking server 706 can select the location of the tracking device 702 determined to be the most accurate. For instance, if the received movement information indicates that the detected movement of the tracking device 702 is very small and/or that the accuracy of the received current location is low (for instance, as a result of the tracking device 702 being determined to be more than a first threshold distance from the mobile device 704), the tracking server 706 can determine that the previous location is more accurate than the current location, and can select the previous location.

Alternatively, if the accessed previous location was received and stored more than a threshold amount of time ago and/or the accuracy of the received current location is high (for instance, as a result of the tracking device 702 being determined to be less than a second threshold distance from the mobile device 704), the tracking server 706 can determine that the current location is more accurate than the previous location. In some embodiments, the tracking server 706 can determine that the current location and the previous location are equally or within a threshold measurement of accuracy to each other and can select both locations. In some embodiments, when the tracking server 706 determines that the current location is more accurate or reliable than the previous location, the tracking server 706 overrides the previous location with the current location in association with the identity of the tracking device 702.

The tracking server 706 provides the one or more select locations 726 to the mobile device 704. In response, the mobile device 704 presents 728 the one or more selected locations, for instance to a user of the mobile device 704. Alternatively, the mobile device 704 can store the one or more selected locations for subsequent access. The mobile device 704 can then provide confirmation 730 to the tracking device 702 that the current location was received and/or stored by the tracking server 706. In response, the tracking device 702 can enter standby mode 732 until subsequent motion of the tracking device 702 is detected.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at a mobile device from a tracking device, a hash value computed by the tracking device based on a unique identifier associated with the tracking device and an incremented value maintained by the tracking device that is incremented every 15 minutes; and
   in response to a determination that the tracking device is not associated with the mobile device, providing, by the mobile device, the received hash value to a tracking server, the tracking server configured to resolve a conflict between the received hash value and one or more other hash values based on a comparison of account information associated with the tracking device and account information associated with each of the one or more other hash values.

2. The method of claim 1, wherein the hash value is computed based further on a key stored by the tracking device.

3. The method of claim 2, wherein the key is also stored by mobile device, and wherein the key is not transmitted between the tracking device and the mobile device.

4. The method of claim 1, wherein the incremented value is incremented by the tracking device after each subsequent passage of a pre-determined interval of time.

5. The method of claim 1, wherein the received hash value is received in an advertisement packet transmitted by the tracking device, and wherein the advertisement packet includes the incremented value in plaintext.

6. The method of claim 1, wherein the tracking server is configured to compute a hash value for each tracking device associated with tracking server, and wherein the tracking server is configured to identify the tracking device in response to a match between a computed hash value and the received hash value.

7. A method comprising:
   receiving, at a tracking server from a mobile device, a hash value computed by a tracking device based on a unique identifier associated with the tracking device and a counter value maintained by the tracking device and transmitted to the mobile device, wherein the counter value is incremented at least once per hour;
   computing, by the tracking server, a hash value corresponding to each of a set of tracking devices associated with the tracking server based on a unique identifier associated with each of the set of tracking devices; and
   in response to a plurality of computed hash values matching the received hash value, determining that the plurality of computed hash values comprise a hash value collision and attempting to resolve the collision by identifying, by the tracking server, one of the plurality of computed hash values as associated with the received hash value based on a comparison of account information associated with the tracking device and account information associated with each of the multiple computed hash values.

8. The method of claim 7, wherein the hash value is computed based further on a key stored by the tracking device.

9. The method of claim 7, wherein the counter value is incremented by the tracking device after each subsequent passage of a pre-determined interval of time.

10. The method of claim 7, wherein the counter value is incremented by the tracking device every 15 minutes.

11. The method of claim 7, wherein the received hash value is received in an advertisement packet transmitted by the tracking device, and wherein the advertisement packet includes the counter value in plaintext.

12. The method of claim 11, wherein the tracking server is configured to compute the hash values corresponding to the set of tracking devices based further on the counter value included in the advertisement packet.

13. A method comprising:
receiving, at a mobile device from a tracking device, a hash value computed by the tracking device based on a unique identifier associated with the tracking device and an incremented value maintained by the tracking device that is incremented multiple times per day; and
in response to a determination that the tracking device is not associated with the mobile device, providing the received hash value to a tracking server, the tracking server configured to resolve a conflict between the received hash value and one or more other hash values based on a proximity of the incremented value to a counter value most recently used by each tracking device corresponding to the one or more other hash values.

14. The method of claim 13, wherein the hash value is computed based further on a key stored by the tracking device.

15. The method of claim 14, wherein the key is also stored by mobile device, and wherein the key is not transmitted between the tracking device and the mobile device.

16. The method of claim 13, wherein the incremented value is incremented by the tracking device after each subsequent passage of a pre-determined interval of time.

17. The method of claim 13, wherein the incremented value is incremented by the tracking device every 15 minutes.

18. The method of claim 13, wherein the received hash value is received in an advertisement packet transmitted by the tracking device, and wherein the advertisement packet includes the incremented value in plaintext.

19. The method of claim 13, wherein the tracking server is configured to compute a hash value for each tracking device associated with tracking server, and wherein the tracking server is configured to identify the tracking device in response to a match between a computed hash value and the received hash value.

* * * * *